United States Patent [19]

Vegh

[11] Patent Number: 5,442,981
[45] Date of Patent: Aug. 22, 1995

[54] CUTTING TOOL

[76] Inventor: William R. Vegh, 5352 Ridgemont, Howell, Mich. 48843

[21] Appl. No.: 194,907

[22] Filed: Feb. 14, 1994

[51] Int. Cl.⁶ .......................... B23B 1/00; B23C 9/00
[52] U.S. Cl. ..................................... 82/1.11; 407/113; 407/119
[58] Field of Search .................. 82/1.11, 162; 407/66, 407/101, 113, 119

[56] References Cited

U.S. PATENT DOCUMENTS

| | | |
|---|---|---|
| 2,414,231 | 1/1947 | Kraus . |
| 2,982,008 | 5/1961 | Facknitz . |
| 3,060,554 | 10/1962 | Kirchner . |
| 3,246,382 | 4/1966 | Zierden . |
| 3,331,116 | 7/1967 | Fussenhauser ..................... 407/101 |
| 3,487,514 | 1/1970 | O'Brien . |
| 3,577,618 | 5/1971 | Cashman . |
| 4,818,153 | 4/1989 | Strandell ............................. 407/113 |
| 5,193,945 | 3/1993 | Nakayama et al. . |

*Primary Examiner*—Jack W. Lavinder
*Attorney, Agent, or Firm*—Ian C. McLeod

[57] ABSTRACT

An improved cutting tool 10 for rotary cutting is described, The tool has a holder 12, a seat 26 and a cutting insert 32. The seat 26 is provided with a wear indicator 30 which creates sparks when the wear indicator comes in contact with the workpiece. The wear indicator 31 is also able to be located in the cutting insert 33. The sparks alert the user of potential future damage to the holder due to contact with the workpiece.

28 Claims, 3 Drawing Sheets

CUTTING TOOL

BACKGROUND OF THE INVENTION (1) Field of the Invention

The present invention relates to an improved cutting tool for rotary cutting. In particular, the present invention relates to a cutting tool having a seat with a visual wear indicator. Due to the nature of cutting tools, the cutting insert which is used to machine the workpiece disintegrates during the machining process. As the cutting tool crumbles, the seat on which the cutting insert is positioned comes in contact with the workpiece and is eventually worn down. The cutting insert is expected to disintegrate and thus, is easily removed and replaced in the holder. The seat is also easily removed and replaced in the holder if damaged during the machining process. Furthermore, the cutting insert and the seat are relatively inexpensive and thus replacement of either one is accepted. If the cutting tool is left unattended, however, the seat will completely wear away which will allow the workpiece to make contact with the holder. Damage to the holder is unacceptable as replacing the holder is not as simple or as inexpensive as replacing the cutting insert or the seat. Thus, contact between the holder and the workpiece must be prevented. To solve this problem, a wear indicator is provided as part of the seat or alternately as part of the cutting insert. Contact between the workpiece and the wear indicator creates sparks which alert the user that the seat or cutting insert is disintegrating, thus enabling the user to shut down the machine before the holder is damaged.

(2) Prior Art

The prior art has described various cutting tools of different configurations and utilizing different materials to comprise the cutting tip and the seat. The prior art patents utilized different materials within the seat, cutting insert and holder in order to reduce the stress in the tool or to prevent vibration of the cutting insert within the holder. Illustrative of such patents are: U.S. Pat. Nos. 2,414,231 to Kraus; 2,982,008 to Facknitz; 3,060,554 to Kirchner; 3,246,382 to Zierden; 3,487,514 to O'Brien; 3,577,618 to Cashman; and 5,193,945 to Nakayama.

Kraus describes a cutting tool wherein the tip is comprised of two layers, a thin layer of a situated carbide forming the cutting surface and a thicker under layer of a material also possessing red hardness and constructing a support for the thin carbide layer. The thicker under layer made from the group of the cast nonferrous alloys facilitates grinding of the tip.

Facknitz describes a cutting tool holder which releasably holds a removable cutting insert having a seat which makes possible the adaption of a single cutting tool holder for a variety of sizes of cutter inserts.

Kirchner describes a cutting tool mounting wherein the tip of the cutting tool is of a different material and exhibits appreciably different thermal expansion characteristics than the material of which the holder or mounting for the cutting tool is formed. The different thermal expansion characteristics of the holder and the cutting tool ensure that when cold, the cutting tool is easily removed from the holder and yet when hot, the cutting tool is held securely within the holder.

Zierden describes a cutting tool wherein the holder and the seat member have been provided with "through pass" machining which permits grinding both the vertical and horizontal surfaces of both the holder and the seat member to any desired degree of planeness and angle between surfaces. This machining allows for a better fit between the holder and the seat member.

O'Brien describes a cutting tool wherein an intervening metal section having a low coefficient of thermal expansion is provided between the ceramic cutting tip and the steel holder. The metal section reduces the inherent stresses of the cutting tip and the steel resulting from the bonding of the materials by brazing.

Cashman describes a tool holder which supports the removable tool bit in a way which reduces the possibility of vibration of the tool bit.

Nakayama describes a cutting tool wherein the positioning block on which the cutting insert is mounted is comprised of two layers. The first layer is made of a soft material such as to absorb undesirable vibrations and shocks which act on the cutting insert during the milling operation. The second layer is made of a high hardness material and is responsible for preventing the wear of the positioning block.

None of the prior art patents show the use of a wear indicator within the seat or the cutting insert to alert the user prior to contact between the workpiece and the holder.

OBJECTS

It is an object of the present invention to provide a method of rotary machining in which the user is alerted before the workpiece contacts the holder of the cutting tool. Further, it is therefore an object of the present invention to provide a seat for a cutting tool which has a wear indicator which will alert the user when the workpiece is contacting the seat. Still further, it is an object of the present invention to provide a seat having a wear indicator wherein the wear indicator will spark when contact is made with the workpiece. Furthermore, it is an object of the present invention to provide a seat with a wear indicator which will emit sparks such that a user is able to see the sparks from a safe distance from the cutting tool. Still further, it is an object of the present invention to provide a seat with a wear indicator which is inexpensive to manufacture and easy to replace.

DETAILED DESCRIPTION OF THE PREFERRED EMBODIMENTS

Figure 1:
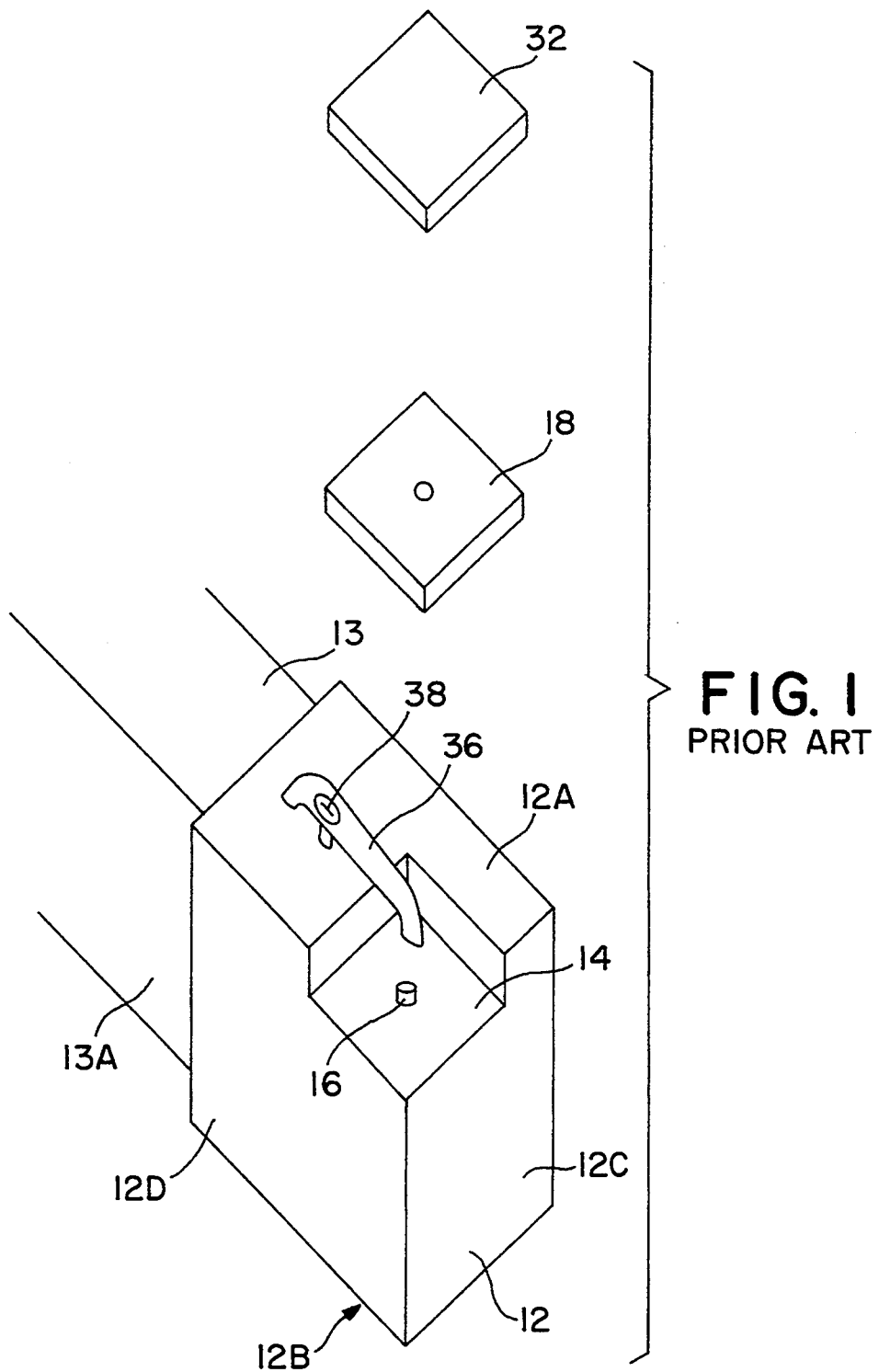
FIG. 1 is an exploded perspective view of the cutting tool 10 with a conventional seat 18 and cutting insert 32 as in the prior art.

The present invention relates to a cutting tool for rotary machining of a workpiece including a cutting insert, optionally a seat for mounting the cutting insert and a holder for mounting the cutting insert on the seat or the holder, wherein the cutting insert has a cutting edge which projects from the holder such that the optional seat and the holder are spaced apart from the cutting of the workpiece, the improvement which comprises: a spark generator means mounted on the cutting tool by a securing means adjacent the cutting edge of the insert, wherein sparks are continuously generated by the spark generator means contacting the workpiece when the cutting insert is worn such that the holder can be damaged by the workpiece being cut and wherein the sparks can be viewed by an operator at a safe distance from the workpiece which is being cut.

Furthermore, the present invention relates to a method for rotary machining without damaging a holder for a cutting insert in a cutting tool which comprises: providing the cutting tool for rotary machining of a workpiece including the cutting insert, optionally a seat for mounting the cutting insert and a holder for mounting the cutting insert on the seat or the holder, wherein the cutting insert has a cutting edge which projects from the holder such that the optional seat and the holder are spaced from the cutting, and a spark generator means provided adjacent the cutting edge of the insert, wherein sparks are continuously generated by the spark generating means contacting the workpiece when the cutting insert is worn such that the holder can be damaged by the workpiece being cut and wherein the sparks can be viewed by an operator at a safe distance from a workpiece which is being cut; cutting the workpiece with the tool until the sparking means engages the sparking means to produce the sparks; and mounting a second cutting edge on the tool.

Finally, the present invention relates to a cutting tool for rotary machining of a workpiece including a cutting insert, optionally a seat for mounting the cutting insert and a holder for mounting the cutting insert on the seat of the holder, wherein the cutting insert has a cutting edge which projects from the holder such that the optional seat and the holder are spaced apart from the cutting of the workpiece, the improvement which comprises: a visual wear indicator means mounted on the cutting tool by a securing means adjacent the cutting edge of the insert, wherein a visual change in the visual wear indicator means is continuously generated by the visual wear indicator means contacting the workpiece when the cutting insert is worn such that the holder can be damaged by the workpiece being cut and wherein the visual change can be viewed by an operator at a safe distance from the workpiece which is being cut.

The spark generator is secured to a part of the cutting insert which engages the workpiece to produce sparks when the cutting insert is worn. Unexpectedly, the spark generator is able to be secured to the seat or the cutting insert inexpensively and securely and yet provide visible sparks so as to alert the user. Alternately, when the seat is used, the spark generator is secured to the seat so as to engage the workpiece when the cutting insert is worn. The spark generator preferably contains cerium metal in an iron matrix.

Figure 2:
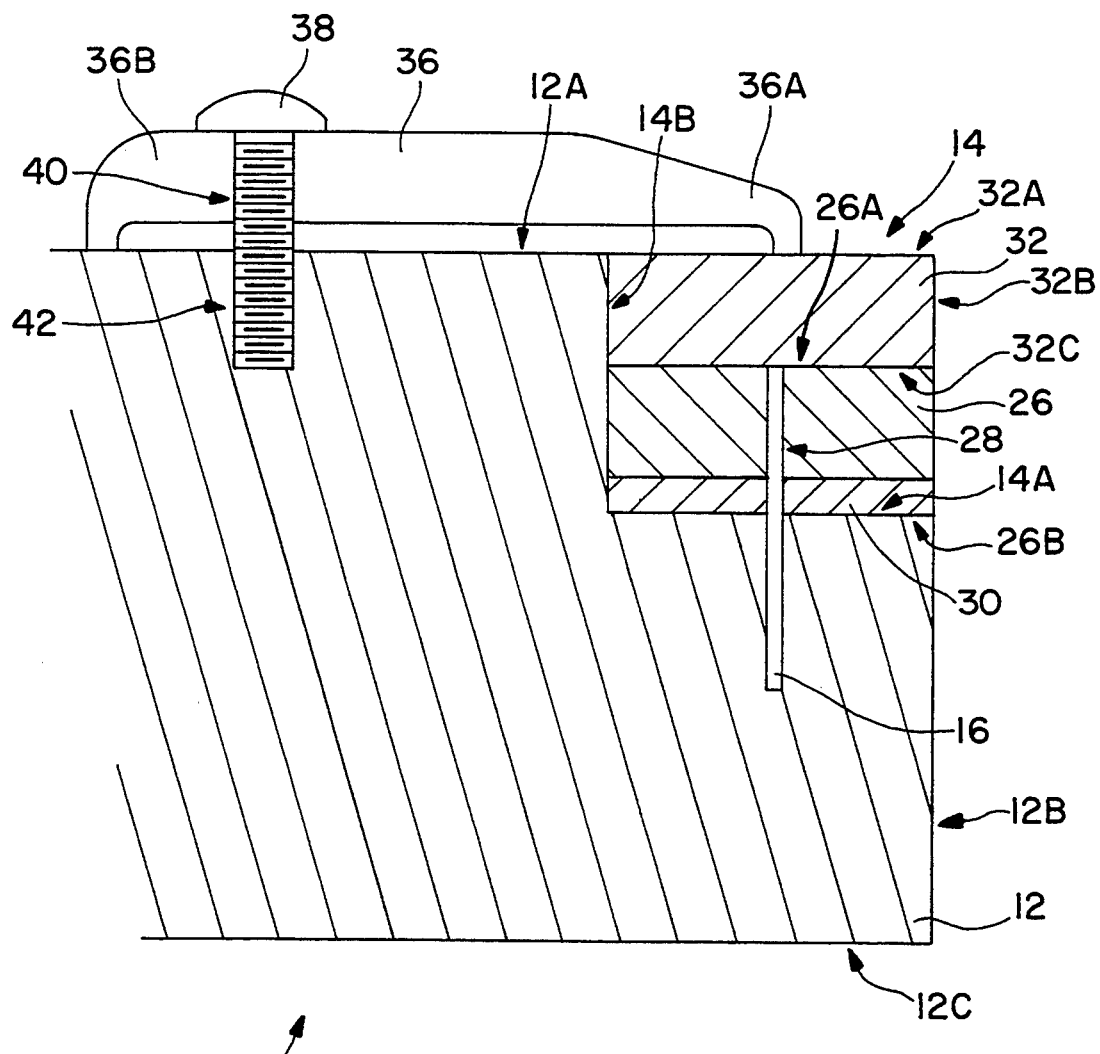
FIG. 2 is a cross-section view of the improved cutting tool 10 showing the holder 12, the cutting insert 32, the clamp 36 with the bolt 38 and the wear indicator 30 located on the bottom 26B of the seat 26.

FIG. 2 shows the preferred embodiment of the improved cutting tool 10 of the present invention. The cutting tool 10 is comprised of a holder 12 with a recess 14, a seat 26, a cutting insert 32 and a wear indicator 30. The holder 12 is preferably similar to the conventional cutting tool holder 12 as shown in the prior art FIG. 1. The holder 12 of the cutting tool 10 is located at the proximal end 13A of the shaft 13 of the cutting tool 10. The distal end (not shown) of the cutting tool 10 is secured within the tooling machine (not shown) during the machining process.

The preferred form of the cutting tool holder 12 is a three dimensional block with a rectangular cubical shape. The holder 12 has a top 12A and a bottom 12B, a front end 12C and a back end (not shown) and a left side 12D and a right side (not shown). The back end of the holder 12 is mounted onto the proximal end 13A of the shaft 13 of the cutting tool 10 (FIG. 1). The top 12A of the holder 12 is provided with a recess 14 which is cut in the corner formed by the left side 12D and the front end 12C of the holder 12. The recess 14 has a floor 14A and two sides 14B. In the preferred embodiment, the floor 14A of the recess 14 has a square shape and the sides 14B of the recess 14 have a height of approximately 1 cm (FIGS. 1 and 2). It is understood, however, that the shape and depth of the recess 14 may vary depending upon the shape and thickness of the cutting insert 32 and the seat 26 of the cutting tool 10 (to be described in detail hereinafter). In the preferred embodiment, the recess 14 is provided with a peg 16 located in the floor 14A of the recess 14 and extending upward toward the top 12A of the holder 12. The peg 16 is preferably centered within the perimeter of the floor 14A of the recess 14.

The seat 26 is mounted in the recess 14 of the holder 12 and has a top 26A and a bottom 26B with four sides 26C around the perimeter. The seat 26 is positioned within the recess 14 such that the bottom 26B of the seat 26 is adjacent the floor 14A of the recess 14 (FIG. 2). The seat 26 is preferably the same shape as the floor 14A of the recess 14. The seat 26, however, preferably extends beyond the sides 14B of the recess 14 such that the seat 26 extends beyond the front end 12C and the left side 12D of the holder 12. The seat 26 extends beyond the holder 12 to enable the workpiece (not shown) to contact the seat 26 without contacting and damaging the holder 12. Preferably, the seat 26 is smaller than the cutting insert 32 (to be described in detail hereinafter) such that the portion of the workpiece which contacts the seat 26 after the cutting insert 32 has been worn away will later be machined away by the new cutting insert 32. The seat 26 has an aperture 28 extending completely through the seat 26 from the top 26A to the bottom 26B. The location of the aperture 28 is such as to fit over the peg 16 of the recess 14 (FIG. 2) when the seat 26 is mounted in the recess 14. The length of the peg 16 extending above the floor 14A of the recess 14 and the thickness of the seat 26 are similar such that the peg 16 extends through the seat 26 from a bottom 26B to a top 26A of the seat 26. Preferably, the top of the peg 16 is flush with the top 26A of the seat 26 when the bottom 26B of the seat 26 is firmly adjacent the floor 14A of the recess 14.

Figure 4:
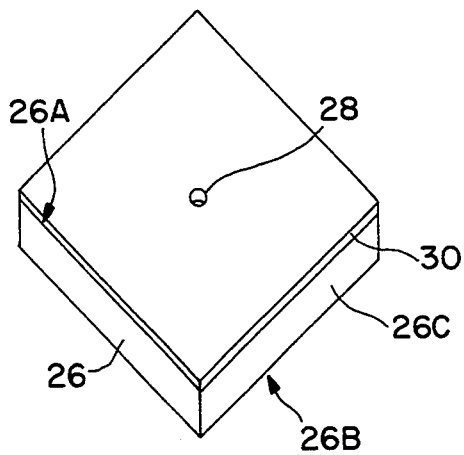
FIG. 4 is a perspective view of the seat 26 of the first embodiment showing the wear indicator 30 located on the top 26A of the seat 26.
Figure 5:
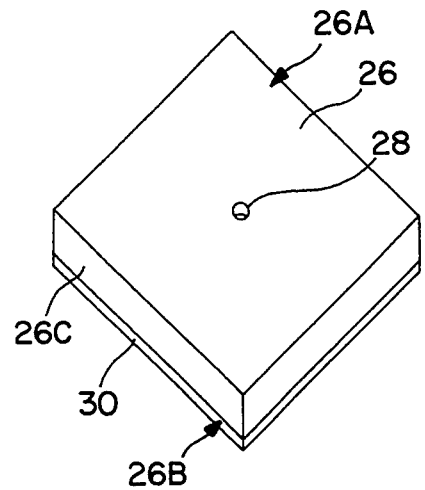
FIG. 5 is a perspective view of the seat 26 of the second embodiment showing the wear indicator 30 located on the bottom 26B of the seat 26.

The seat 26 is provided with a wear indicator 30. As shown in FIGS. 4 to 7, the wear indicator 30 is located at various positions on the seat 26 depending upon the particular use of the cutting tool 10. In a first embodiment as shown in FIG. 4, the wear indicator 30 is located on the top 26A of the seat 26 such that the wear indicator 30 is adjacent the bottom surface 32C of the cutting insert 32 (to be described in detail hereinafter) when the cutting insert 32 and the seat 26 are mounted in the recess 14 of the holder 12. In a second embodiment, the wear indicator 30 is located on the bottom 26B of the seat 26 such that when the seat 26 is positioned in recess 14, the wear indicator 30 is adjacent the floor 14A of the recess 14 (FIG. 5). It is understood that in the first and second embodiments, the seat 26 is identical in construction provided the aperture 28 is in the center of the seat 26. In general, the aperture 28 is located in the center of the seat 26 such as to allow the seat 26 to be rotated such that all four corners of the seat 26 are able to be used during the machining process.

Figure 6:
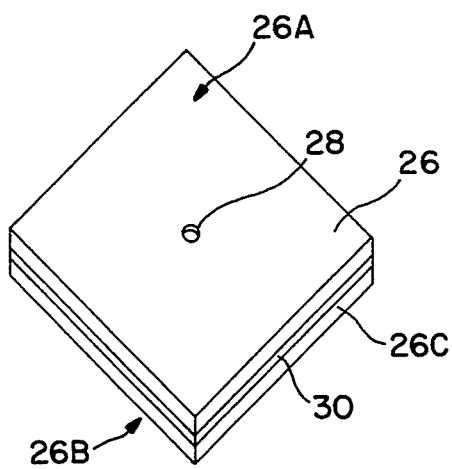
FIG. 6 is a perspective view of the seat 26 of the fourth embodiment with the wear indicator 30 located within the seat 26.

In the third embodiment as shown in FIG. 6, the wear indicator 30 is located within the seat 26 such that the wear indicator 30 is between the top 26A and bottom 26B of the seat 26 and is accessible at all four sides 26C of the seat 26. The first, second and third embodiments of the seat 26 allow for various amounts of wear on the seat 26 before the workpiece comes in contact with the wear indicator 30. In the first embodiment, the workpiece contacts the wear indicator 30 as soon as the cutting insert 32 has completely disintegrated (FIG. 4). Thus, the positioning of the wear indicator 30 in the first embodiment alerts the user of wearing down of the seat 26 at the earliest stage. In the second embodiment, the workpiece does not contact the wear indicator 30 until a majority of the seat 26 has been worn away (FIG. 5). This embodiment gives the user less time between the first indication of wear of the seat 26 and contact between the workpiece and the holder 12. The third embodiment is intermediate between the first and second embodiments and alerts the user first by the initial contact, then by the continuing contact and finally by the loss of contact (FIG. 6). Thus, when the sparks cease, the user knows that the seat 26 is completely worn away.

Figure 7:
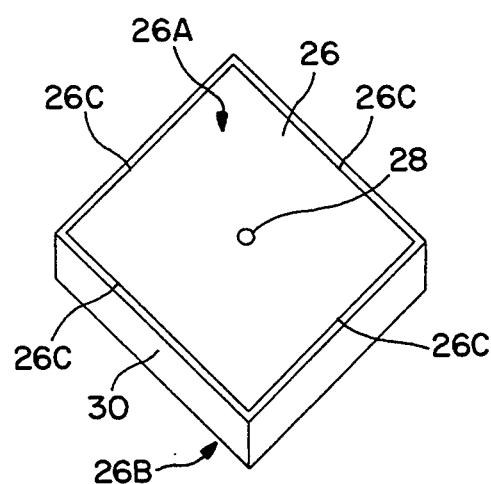
FIG. 7 is a perspective view of the seat 26 of the third embodiment showing the wear indicator 30 located on the sides 26C of the seat 26.

Finally, FIG. 7 shows the fourth embodiment of the seat 26 with the wear indicator 30 located on and around all four sides 26C of the seat 26. This position allows the workpiece to make contact with the wear indicator 30 as soon as the cutting insert 32 has worn away and to maintain contact with the wear indicator 30 until the entire seat 26 is worn away.

In the first, second and third embodiments of the present invention, the wear indicator 30 is preferably the same size and shape as the seat 26. The optimum thickness of the wear indicator 30 is preferably 0.26 cm. It is understood however, that the thickness of the wear indicator 30 is variable. It is feasible to increase the thickness of the wear indicator 30 such that the entire seat 26 is comprised of the wear indicator 30. However, a wear indicator 30 of less than 0.06 cm thick is generally ineffective in alerting the user before damaging contact is made between the workpiece and the holder 12.

In the fourth embodiment, the wear indicator 30 preferably spans all the sides 26C of the seat 26 (FIG. 7) from the top 26A to the bottom 26B of the seat 26. The thickness of the wear indicator 30 is preferably 0.13 cm such that the seat 26 with the wear indicator 30 extends beyond the recess 14 of the holder 12 but preferably not beyond the cutting insert 32 (to be discussed in detail hereinafter).

In all of the above four embodiments, the wear indicator 30 is preferably molded together with the seat 26 during the initial manufacture of the seat 26. It is understood however, that the wear indicator 30 is also able to be secured to the seat 26 after manufacture of the seat 26 by various other means such as an adhesive (not shown) or by a fastener (not shown).

In all of the above embodiments, the seat 26 is preferably comprised of nickel, carbide, cobalt or carbon and is approximately 0.5 cm thick. It is understood, that other materials such as cermet (an alloy with cermanic) or ceramic are also able to be used. The seat 26 is constructed of a material softer than that of the cutting insert 32 such that when the workpiece contacts the seat 26, the seat 26 wears down easily without affecting the workpiece. The seat 26 also assists in cushioning the cutting insert 32 within the recess 14 of the holder 12 and thus, using a softer, pliable material to construct the seat 26, is preferred. The choice of construction material for the seat 26 will necessarily depend upon the intended use of cutting tool 10 and also on the materials used to construct the holder 12, the cutting insert 32 and the wear indicator 30.

In all four embodiments of the cutting tool 10 having the wear indicator 30 as part of the seat 26, the wear indicator 30 is preferably constructed of cerium metal in an iron matrix. Other cerium alloys such as mixed with other rare earth metals and sometimes 1 to 5% iron can also be used. The wear indicator 30 may also be comprised of an alloy of cerium and zirconium with a mixture of 30% cerium and 70% zirconium being preferred. Finally, an iron matrix including titanium, magnesium and cerium can be used for the wear indicator 30. The specific construction of the wear indicator 30 depends upon the specific use of the cutting tool 10 and especially the type of metal being machined. The seat 26 can also be constructed from the above mentioned materials which will allow the seat 26 to act similarly to the wear indicator 30 if contact is made with the workpiece. In addition, if the wear indicator 30 uses another visual indicator besides sparks to alert the user, the wear indicator 30 may be constructed from a variety of different materials. In this case, some other visual change is provided by the wear indicator 30 such as showing a different color due to different levels of paint used on the wear indicator 30.

The cutting insert 32 is positioned on the top 26A of the seat 26 within the recess 14 of the holder 12. Preferably, when correctly positioned, the top surface 32A of the cutting insert 32 is flush with the top 12A of the holder 12 and bottom surface 32C of the cutting insert 32 is adjacent the top 26A of the seat 26. The cutting insert 32 is the same shape as the recess 14 but is greater in size such that the cutting edge 32B of the cutting insert 32 extends beyond the front end 12C and the left side 12D of the holder 12 and also slightly beyond the seat 26. The extension of the cutting insert 32 beyond the holder 12 enables the cutting edge 32B of the cutting insert 32 to cut the workpiece without damaging the holder 12. The cutting insert 32 is preferably similar to those well known in the prior art (FIG. 1). The cutting insert 32 is preferably constructed of any well known material used for cutting inserts 32 such as carbide, cobalt and cermanic. In the preferred embodiment, the cutting insert 32 has a thickness of approximately 0.5 cm. The thickness of the cutting insert 32 necessarily depends upon the depth of the recess 14 of the holder 12, and the thickness of the seat 26 and the particular use of the cutting tool 10.

Figure 3:
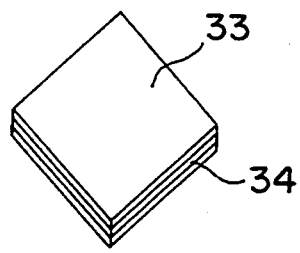
FIG. 3 is a perspective view of the cutting insert 33 of the alternate embodiment having the wear indicator 31 within the cutting insert 33.

In an alternate embodiment as shown in FIG. 3, the cutting insert 33 is provided with the wear indicator 34 sandwiched within the cutting insert 33. The seat 18 is preferably provided between the cutting insert 33 and the holder 12 and is preferably similar to the conventional seat 18 as shown in the prior art FIG. 1. The wear indicator 34 alerts the user that the cutting insert 33 has disintegrated approximately halfway. Thus, the user is able to replace the cutting insert 33 before the workpiece comes in contact with the conventional seat 18. In this embodiment, the wear indicator 34 is used to alert the user in order that the user is able to shut off the machine before the workpiece encounters the seat 26. Having the wear indicator 34 in the cutting insert 33 also notifies the user at an earlier stage which gives the user more time to respond before damage is done to the holder 12.

A clamp 36 having a first end 36A and second end 36B and is mounted to the top 12A of the holder 12 by a bolt 38. The bolt 38 extends through an aperture 40 in the second end 36B of the clamp 36 and into a hole 42 in the top 12A of the holder 12. The clamp 36 is preferably similar to the clamp 36 shown in the prior art U.S. Pat. No. 5,193,943 to Nukayama et al (FIG. 1).

The clamp 36 is positioned adjacent the recess 14 of the holder 12 such that the first end 36A of the clamp 36 extends over the recess 14 in order to clamp the cutting insert 32 and the seat 26 to the floor 14A of the recess 14. As shown in FIG. 2, the cutting insert 32 is secured in place on the seat 26 and in the holder 12 by the clamp 36. To secure the cutting insert 32 in the recess 14, the bolt 38 of the clamp 36 is tightened such that the first end 36A of the clamp 36 contacts the top surface 32A of the cutting insert 32 and forces the cutting insert 32 down onto the seat 26 such as to forcibly secure the cutting insert 32 and the seat 26 into the recess 14. The clamp 36 With the bolt 38 enables the cutting insert 32 and the seat 26 to be easily removed and replaced in the holder 12 of the cutting tool 10.

EXAMPLES

Several experiments were conducted using different metals and alloys to construct the wear indicator test sample. The following examples were conducted using a simulated lathe having a speed of between 1,500 to 15,000 RPM. A standard cutting tool holder with a clamp was used to hold the wear indicator test sample during the experiments. In the tests, the wear indicator test sample was tested separately and was not attached to a seat or a cutting insert. Neither a seat or a cutting insert were used in the experiments. The workpiece machined in the following examples was constructed of hardened steel.

EXAMPLE I

In the first experiment, the wear indicator test sample was constructed solely of titanium. The test was conducted at two temperature levels; a cold temperature (room temperature) before the workpiece and the test sample had become heated and at a hot temperature after the workpiece had become red hot. The hot temperature is closer to the actual operating temperature of the wear indicator during the normal machining process. At the cold temperature, the wear indicator sample emitted no visible sparks and had negligible wear caused by the workpiece. At the higher temperature, the wear indicator sample emitted white sparks approximately 2 to 5 cm long and had negligible wear due to contact with the workpiece. This construction is not the preferred construction of the wear indicator due to the small size of the sparks at the high temperature and the absence of sparks at the low temperature. This experiment however does show that a titanium wear indicator has very little decay due to contact with the workpiece.

EXAMPLE II

The second test was conducted using a wear indicator test sample constructed entirely of magnesium. The test was conducted similarly to Example I with the same set up and at the high and low temperatures. At the lower temperature, the test sample emitted no sparks and showed only minor wear due to contact with the workpiece. At the higher temperature, the test sample emitted brilliant white starbursts, however contact between the sample and the workpiece essentially produced spontaneous combustion of the work sample. The test showed that magnesium cannot be used successfully to construct the entire wear indicator, however, sporadic spotting of magnesium throughout a wear indicator constructed of another metal would increase the brilliance of the spark emitted by the wear indicator at high temperatures.

EXAMPLE III

The third experiment used a wear indicator test sample constructed entirely of cerium. The tests were conducted similarly to the proceeding Examples. At the cold temperature, the sample produced white sparks 7 to 15 cm long which were accompanied by rapid decay of the sample. Similarly, at the hot temperature, the sample emitted brilliant white starbursts 30 to 70 cm long which were accompanied by spontaneous combustion or rapid decay of the sample. This experiment showed that cerium alone would not be a preferable choice for the wear indicator, although, use of some amount of cerium would be preferable to create the brilliant white starbursts in order to better alert the user.

EXAMPLE IV

Example IV illustrates the test results for the wear indicator having the preferred construction. The fourth experiment was conducted using a wear indicator test sample constructed from iron and cerium. Particularly, a mixture of 70% iron and 30% cerium was used. At the cold temperature, contact between the workpiece and the wear indicator sample caused sparks approximately 7 to 10 cm long with negligible wear on the test sample due to contact with the workpiece. At the higher temperature, contact between the wear indicator and the workpiece produced brilliant white sparks with accompanying starbursts. The wear indicator however also decayed rapidly and tended to break up due to the contact with the workpiece. The rate of decay, however, was sufficiently slow so that the duration of the brilliant white sparks was adequate to alert the user. To reduce the rate of decay of the wear indicator, other metals such as zinc or titanium can be added to the cerium along with the iron to increase the hardness of the wear indicator which raises the temperature at which the wear indicator begins to rapidly decay. The ability of the wear indicator to withstand higher temperatures is especially important when the workpiece is constructed from harder metals. In addition, increasing the amount of cerium used in the wear indicator increases the brilliance and length of the warning spark. Likewise, other metals such as magnesium can be added to the wear indicator to increase the brilliance during sparking.

IN USE

To construct the cutting tool 10, the seat 26 is placed within the recess 14 of the holder 12 and the cutting insert 32 is placed on the top 26A of the seat 26. The clamp 36 is then rotated on the bolt 38 such that the first end 36A of the clamp 36 is in contact with the top surface 32A of the cutting insert 32. The bolt 38 is then tightened so that the cutting insert 32 is snugly mounted against the seat 26 and the seat 26 is pressed against the floor 14A of the recess 14. The cutting tool 10 is then ready to be used to machine the workpiece. The set up of the cutting tool 10 is the same regardless of the position of the wear indicator 30.

At the beginning of machining, the workpiece is brought into contact with the cutting insert 32. As the machining continues, the cutting insert 32 gradually disintegrates. If the wear indicator 31 is located on the cutting insert 33 then it is during this stage that the wear indicator 31 creates sparks and alerts the user. Once the cutting insert 32 has completely disintegrated, the workpiece is then able to come in contact with the seat 26. At this point, depending upon the positioning of the wear indicator 30 on the seat 26, the wear indicator 30 will either instantaneously make contact with the workpiece or will eventually make contact as the seat 26 is worn away. Once the workpiece comes in contact with the wear indicator 30, the friction between the wear indicator 30 and the workpiece resulting from the machining process causes the wear indicator 30 to wear down. As the workpiece contacts the wear indicator 30, sparks are created due to the construction material of the wear indicator 30. The intensity and duration of the sparks emitted by the wear indicator 30 depends upon the thickness of the wear indicator 30 and the material used in the construction of the wear indicator 30. The sparks created by the wear indicator 30 alert the user that the cutting insert 32 has completely worn away and that the workpiece is now contacting the seat 26. Depending on the location of the wear indicator 30, the user can tell by the sparks exactly how far the seat 26 has been worn down. In the first and third embodiments, the cessation of the sparks indicates to the user that the last portion of the seat 26 has been entered. The side mounted wear indicator 30 provides sparks for a longer duration in order to increase the likelihood of catching the user's attention. The sparks caused by the wear indicator 30 are extensive enough so that the user is able to see the sparks from a safe distance from the cutting tool 10.

Once the user sees the sparks, the cutting tool 10 is shut down to stop the machining process. The bolt 38 holding the clamp 36 is loosened so as to enable the user to rotate the seat 26 and the cutting insert 32 such that a new corner of the cutting tool 10 and the seat 26 with the wear indicator 30 is able to be used. Once all sides of the cutting insert 32 are worn away, the cutting tool 10 and the seat 26, if necessary, are replaced.

Numerous variations will occur to those skilled in the art. It is intended, therefore, that the foregoing descriptions be only illustrative of the present invention and that the present invention be limited only by the hereinafter appended claims.

I claim:

1. In a cutting tool for rotary machining of a workpiece including a cutting insert and a holder for mounting the cutting insert, wherein the cutting insert has a cutting edge which projects from the holder such that the holder is spaced apart from the cutting of the workpiece, the improvement which comprises:

a spark generator means mounted on the cutting tool by a securing means adjacent the cutting edge of the insert, wherein sparks are continuously generated by the spark generator means contacting the workpiece when the cutting insert is worn such that the holder will not be damaged by the workpiece being cut and wherein the sparks can be viewed by an operator at a safe distance from the workpiece which is being cut.

2. The tool of claim 1 wherein the spark generator means is secured by the securing means to a part of the cutting insert which engages the workpiece to produce the sparks when the cutting insert is worn.

3. The tool of claim 1 wherein the spark generator means is secured by the securing means to a seat provided for the cutting insert so as to engage the workpiece when the cutting insert is worn.

4. The tool of claim 1 wherein the spark generator means is mounted by the securing means on a face of a seat provided for the cutting insert so as to engage the workpiece when the cutting insert is worn.

5. The tool of claim 1 wherein the spark generator means is mounted on a face of a seat provided for the cutting insert below the cutting edge by the securing means so as to engage the workpiece when the cutting insert is worn.

6. The tool of claim 1 wherein the spark generator means is mounted between a seat provided for the cutting insert and the holder by the securing means so as to engage the workpiece when the cutting insert is worn.

7. The tool of claim 1 wherein the spark generator means is mounted on the holder by the securing means so as to engage the workpiece when the tool is worn.

8. The cutting tool of claim 1 wherein the spark generator means contains cerium metal in an iron matrix.

9. The cutting tool of claim 8 wherein the spark generating means is nodular iron.

10. The cutting tool of claim 1 wherein the spark generating means is an alloy of cerium and zirconium.

11. The cutting tool of claim 10 wherein a seat provided for the cutting insert is made of the alloy.

12. The cutting tool of claim 10 wherein a seat provided for the cutting insert is provided with a coating of the alloy.

13. The cutting tool of claim 1 wherein the spark generating means is an alloy of an iron matrix of titanium, magnesium and cerium.

14. The cutting tool of claim 1 wherein the spark generating means is an alloy of 70% zirconium and 30% cerium by weight.

15. A method for rotary machining without damaging a holder for a cutting insert in a cutting tool which comprises:

(a) providing the cutting tool for rotary machining of a workpiece including the cutting insert and a holder for mounting the cutting insert, wherein the cutting insert has a cutting edge which projects from the holder such that the holder is spaced from the cutting insert, and a spark generator means provided adjacent the cutting edge-of the insert, wherein sparks are continuously generated by the spark generator means contacting the workpiece when the cutting insert is worn such that the holder will not be damaged by the workpiece being cut and wherein the sparks can be viewed by an operator at a safe distance from the workpiece which is being cut;

(b) cutting the workpiece with the tool until the spark generator means engages the workpiece to produce the sparks; and (c) mounting a second cutting edge on the tool.

16. The method of claim 15 wherein the spark generator means is secured by a securing means to a part of the cutting insert and engages the workpiece to produce the sparks when the cutting insert is worn.

17. The method of claim 15 wherein the spark generator means is secured by a securing means to a seat which is provided for the cutting insert and engages the workpiece when the cutting insert is worn.

18. The method of claim 15 wherein the spark generator means is mounted by a securing means on a face of a seat which is provided for the cutting insert and engages the workpiece when the cutting tool is worn.

19. The method of claim 15 wherein the spark generator means is mounted on a face of a seat which is provided for the cutting insert below the cutting edge by a securing means and engages the workpiece when the cutting insert is worn.

20. The method of claim 15 wherein the spark generator means is mounted between a seat which is provided for the cutting means and the holder by a securing means and engages the workpiece when the cutting insert is worn.

21. The method of claim 15 wherein the spark generator means is mounted on the holder by a securing means and engages the workpiece when the tool is worn.

22. The method of claim 15 wherein the spark generator means contains cerium metal in an iron matrix which generates the spark as the workpiece is engaged.

23. The method of claim 15 wherein the spark generating means is cerium in nodular iron which generates a spark as the workpiece is engaged.

24. The method of claim 15 wherein the spark generating means is an alloy of cerium and zirconium which generates a spark as the workpiece is engaged.

25. The method of claim 24 wherein the spark generating means is an alloy of 70% zirconium and 30% cerium by weight which generates a spark as the workpiece is engaged.

26. The method of claim 24 wherein a seat which is provided for the cutting insert and is made of an alloy.

27. The method of claim 24 wherein a seat is provided for the cutting insert with a coating of the alloy.

28. The method of claim 15 wherein the spark generating means is an alloy of an iron matrix of titanium, magnesium and cerium.

* * * * *